(12) United States Patent
Finizio et al.

(10) Patent No.: US 7,088,525 B2
(45) Date of Patent: Aug. 8, 2006

(54) UNIVERSAL SECURITY CAMERA

(75) Inventors: Francesco Finizio, Mission Viejo, CA (US); Richard Grich, Mission Viejo, CA (US); Xavier Bengoechea, Newport Beach, CA (US)

(73) Assignee: Thales Avionics, Inc., Edison, NJ (US)

( * ) Notice: Subject to any disclaimer, the term of this patent is extended or adjusted under 35 U.S.C. 154(b) by 0 days.

(21) Appl. No.: 10/989,528

(22) Filed: Nov. 16, 2004

(65) Prior Publication Data
US 2005/0063696 A1 Mar. 24, 2005

Related U.S. Application Data

(63) Continuation of application No. 10/164,680, filed on Jun. 6, 2002, now Pat. No. 6,824,317.

(60) Provisional application No. 60/333,399, filed on Nov. 26, 2001, provisional application No. 60/331,972, filed on Nov. 21, 2001.

(51) Int. Cl.
*G02B 15/14* (2006.01)
(52) U.S. Cl. ..................... 359/703; 359/704
(58) Field of Classification Search ............... 359/694, 359/819, 822, 703, 704, 738–740, 749–753
See application file for complete search history.

(56) References Cited

U.S. PATENT DOCUMENTS

| | | | |
|---|---|---|---|
| 3,659,045 A | 4/1972 | Siebert | 348/374 |
| 4,160,999 A | 7/1979 | Claggett | 348/151 |
| 4,283,743 A | 8/1981 | Kaiser | 348/829 |
| 4,394,692 A | 7/1983 | Randmae et al. | 348/374 |
| 4,652,930 A | 3/1987 | Crawford | 348/357 |
| 4,673,267 A | 6/1987 | Erxleben | 352/242 |
| 4,736,218 A | 4/1988 | Kutman | 396/427 |
| 4,764,008 A | 8/1988 | Wren | 396/427 |
| 4,803,557 A | 2/1989 | Bridges | 348/374 |

(Continued)

FOREIGN PATENT DOCUMENTS

DE    195 42 481 C1    2/1997

(Continued)

OTHER PUBLICATIONS

Patent Abstracts of Japan, vol. 014, No. 194 (E-0919) (Apr. 20, 1990) and JP 02 039776 A, Canon Inc. (Feb. 8, 1990).

*Primary Examiner*—Ricky Mack
*Assistant Examiner*—M. Hasan
(74) *Attorney, Agent, or Firm*—Gardner Carton & Douglas LLP

(57) ABSTRACT

A security camera has an adjustable turret that holds a lens assembly which can be aimed in various directions. The camera also has a compact housing which, in combination with the adjustable directionality of the turret, enables universal mounting to various structures and positions in an aircraft cabin. The camera operates in light and dark conditions, as the lens assembly is configured to focus visible and infrared light wavelengths onto a fixed focal plane. In an embodiment, the camera includes an infrared illumination source to illuminate a field of view during dark conditions. The lens assembly includes a rigid barrel with a pinhole aperture through which light enters a series of lens elements. An optical sensor is mounted to an opposite end of the barrel at the fixed focal plane to generate an electronic image signal, and the sensor is rotatably adjustable to yield a correct image orientation depending on the turret position.

21 Claims, 8 Drawing Sheets

U.S. PATENT DOCUMENTS

| | | | |
|---|---|---|---|
| 5,003,401 A | 3/1991 | Otsuka | 348/374 |
| 5,032,856 A | 7/1991 | McMinn | 396/427 |
| 5,115,263 A | 5/1992 | Bernhardt et al. | 396/535 |
| 5,153,623 A | 10/1992 | Bouvier | 396/427 |
| 5,181,120 A | 1/1993 | Hickey et al. | 348/373 |
| 5,221,964 A | 6/1993 | Chamberlain et al. | 348/373 |
| 5,223,872 A | 6/1993 | Stiepel et al. | 396/427 |
| 5,240,220 A | 8/1993 | Elberbaum | 248/558 |
| 5,557,329 A | 9/1996 | Lim | 348/373 |
| 5,563,659 A | 10/1996 | Bernhardt et al. | 348/373 |
| 5,640,207 A | 6/1997 | Rahmouni et al. | 348/374 |
| 5,701,015 A | 12/1997 | Lungershausen et al. | 250/495.1 |
| 5,781,336 A | 7/1998 | Coon et al. | 359/355 |
| 5,905,923 A | 5/1999 | Chitsaz et al. | 396/428 |
| 5,966,176 A | 10/1999 | Chow et al. | 348/373 |
| 6,147,815 A | 11/2000 | Fujie | 359/742 |
| 6,208,459 B1 | 3/2001 | Coon et al. | 359/355 |
| 6,362,921 B1 * | 3/2002 | Iida et al. | 359/627 |
| 6,375,369 B1 | 4/2002 | Schneider et al. | 396/427 |
| 6,642,955 B1 | 11/2003 | Midgley et al. | 348/164 |
| 6,860,653 B1 * | 3/2005 | DiRisio | 396/349 |
| 2003/0093805 A1 | 5/2003 | Gin | 725/105 |

FOREIGN PATENT DOCUMENTS

| | | |
|---|---|---|
| DE | 199 21 734 A1 | 11/2000 |
| FR | 2 697 961 A1 | 5/1994 |
| WO | WO 90/05426 A1 | 5/1990 |
| WO | WO 01/03437 A1 | 1/2001 |

* cited by examiner

UNIVERSAL SECURITY CAMERA

CROSS-REFERENCE TO RELATED APPLICATIONS

This patent application is a continuation of U.S. patent application Ser. No. 10/164,680, filed Jun. 6, 2002 now U.S. Pat. No. 6,824,317, which claims priority to U.S. provisional patent application No. 60/331,972, filed Nov. 21, 2001, and U.S. provisional patent application No. 60/333,399, filed Nov. 26, 2001.

FIELD OF THE INVENTION

The present invention relates to a universally mountable video camera and more specifically relates to a security camera that can be used both in light and in dark conditions and has a compact structure suitable for mounting in a variety of positions and environments.

BACKGROUND OF THE INVENTION

Video security cameras are a useful tool for enhancing safety in public and/or secure areas. A security camera allows activity to be monitored for identification, for alerting the occurrence of unwanted activity or intrusions and/or for providing a signal that may be recorded for later reference or potential use as evidence. For example, security cameras are commonly used to monitor activities in airports, banks, shopping areas, parking lots, train stations, etc.

Due to a heightened concern for safety aboard commercial passenger aircraft, security cameras are desired to monitor passenger activity in various places of an aircraft cabin, particularly in the vicinity outside the cockpit door. Additionally, the National Transportation and Safety Board recently proposed a regulation that would require the installation of a video camera in the cockpit of each commercial aircraft for recording pilot activities for use in analyzing aircraft accidents.

For use in commercial aircraft applications, each security camera is mounted at one of several typical installation locations in the aircraft cabin, each installation location having particular structural surroundings and desired orientation. Depending on a customer's needs the aircraft can be equipped with one or more cameras at these various installation locations. The various installation locations may require a respective camera to be mounted behind a vertical wall, above a ceiling panel, to a bulkhead, etc., and each such location requires a particular camera view angle for monitoring a desired portion of the cabin. As a result, a variety of camera types have been designed in order to satisfy the particular constraints of the various camera installation locations. Duplicative resources are consumed in redesigning a camera for different installation locations, as each type of camera must be engineered, manufactured, supplied, purchased, stocked, installed and maintained. A need, therefore, exists for a security camera that can be universally mounted at each commonly desired installation location within an aircraft cabin.

Security cameras must operate in widely varying lighting conditions. Conventional security cameras are operable to generate a video image from visible light but are incapable of functioning in low-light conditions or darkness. A need therefore exists for a security camera that can be used in variable lighting conditions ranging from bright daylight to pitch dark.

SUMMARY OF THE INVENTION

The present invention provides an improved security camera that has enhanced utility. Preferably, the security camera has an external configuration that enables the camera to be mounted at any one of a plurality of locations in an aircraft cabin where a camera is desired. According to various aspects of the invention, the camera is adjustable to provide a desired view for a particular mounting position and/or to accommodate various lighting conditions. Such a universally mountable camera is particularly economical in a multi-camera aircraft cabin security system and/or for equipping multiple aircraft with security one or more cameras in a variety of installation locations, for example, outside a cockpit door or within a cockpit. The manufacturer, installer, and operator conserve resources by using a single type of universal security camera for each installation location, as opposed to using multiple types of cameras specifically configured for each installation location.

For example, in an embodiment, the camera includes a housing, a turret mounted to the housing for relative rotation about a turret axis, a lens assembly mounted to the turret wherein the lens assembly has a central optical axis that is at an oblique angle relative to the turret axis, and an optical sensor mounted to the lens assembly generally at a fixed focal plane, the sensor being rotatably adjustable relative to the optical axis.

According to a preferred embodiment of the invention, the lens assembly is configured to focus a range of light wavelengths on the fixed focal plane, wherein the range includes both visible and infrared light wavelengths. A suitable lens assembly has been found to include a plurality of lens elements rigidly mounted in position along the central optical axis within a barrel having a pinhole aperture at an object end of the lens elements. In a particular embodiment, four achromatic doublets are formed by at least some of the lens elements. The optical sensor is mounted to the barrel at the focal plane, opposite the object end. Such an embodiment advantageously permits the camera to be operated in conditions with or without visible light. In an embodiment, the camera additionally includes an infrared illumination source to provide infrared illumination when visible light is below a certain level. Advantageously, this feature enables the camera to be used in dark conditions where adequate illumination of the view area is not available from an external illumination source.

Depending on the selected orientation of the lens assembly to monitor a desired area, the optical sensor is rotatably adjustable relative to the lens assembly to square up the resulting video image for correct viewing orientation on a monitor. This adjustability provides a high degree of versatility to enable the camera to be mounted in various positions associated with the different installation locations and/or to change the viewing direction.

In an embodiment, the camera includes a transparent, protective window to cover the lens assembly. In such an embodiment, the barrel preferably has a beveled tip to enable the lens assembly to be positioned so that the pinhole aperture is close to an interior side of the window. The beveled barrel shaped facilitates a compact design.

In an embodiment, the camera additionally includes a filter to block visible wavelengths of light generated by the infrared illumination source from passing to an exterior of the camera. The filter advantageously avoids drawing attention to the camera from a human observer. In an embodiment, the filter may be selected to help camouflage the camera or to blend with its surroundings.

Another advantage of the present invention is that it provides a compact security camera that can be universally mounted in multiple installation locations within an aircraft cabin. This allows the use of a single design for all of the cameras of a multi-camera aircraft security system, conserving resources in designing, manufacturing, purchasing, stocking, installing and maintaining only one type of camera.

In another embodiment of the present invention, a turret is provided which is adapted for use with a camera that comprises a lens assembly and a housing, wherein the turret is mounted to the lens assembly and to the housing for relative rotation about a turret axis. The turret comprises a window that is mounted to the turret in a perpendicular direction to the turret axis, such that the lens assembly is closely spaced from an interior side of the window.

The present invention also provides a turret which is adapted for use with a camera that comprises a lens assembly which includes a barrel, the turret comprising a sleeve shaped to complimentarily receive the barrel which comprises one or more alignment slots that receive one or more locator pins that project from the barrel to prevent the barrel from rotating within the sleeve.

The present invention also provides a lens assembly which is adapted for use with a camera that comprises a housing and a turret, the lens assembly comprising: a barrel, at least one lens element mounted within the barrel, and a pinhole aperture defined within a tip of the barrel at an object end of the at least one lens element.

Additional features and advantages of the present invention are described in, and will be apparent from, the following description, figures and claims.

DETAILED DESCRIPTION OF THE PREVIOUSLY PREFERRED EMBODIMENTS

Figure 1:
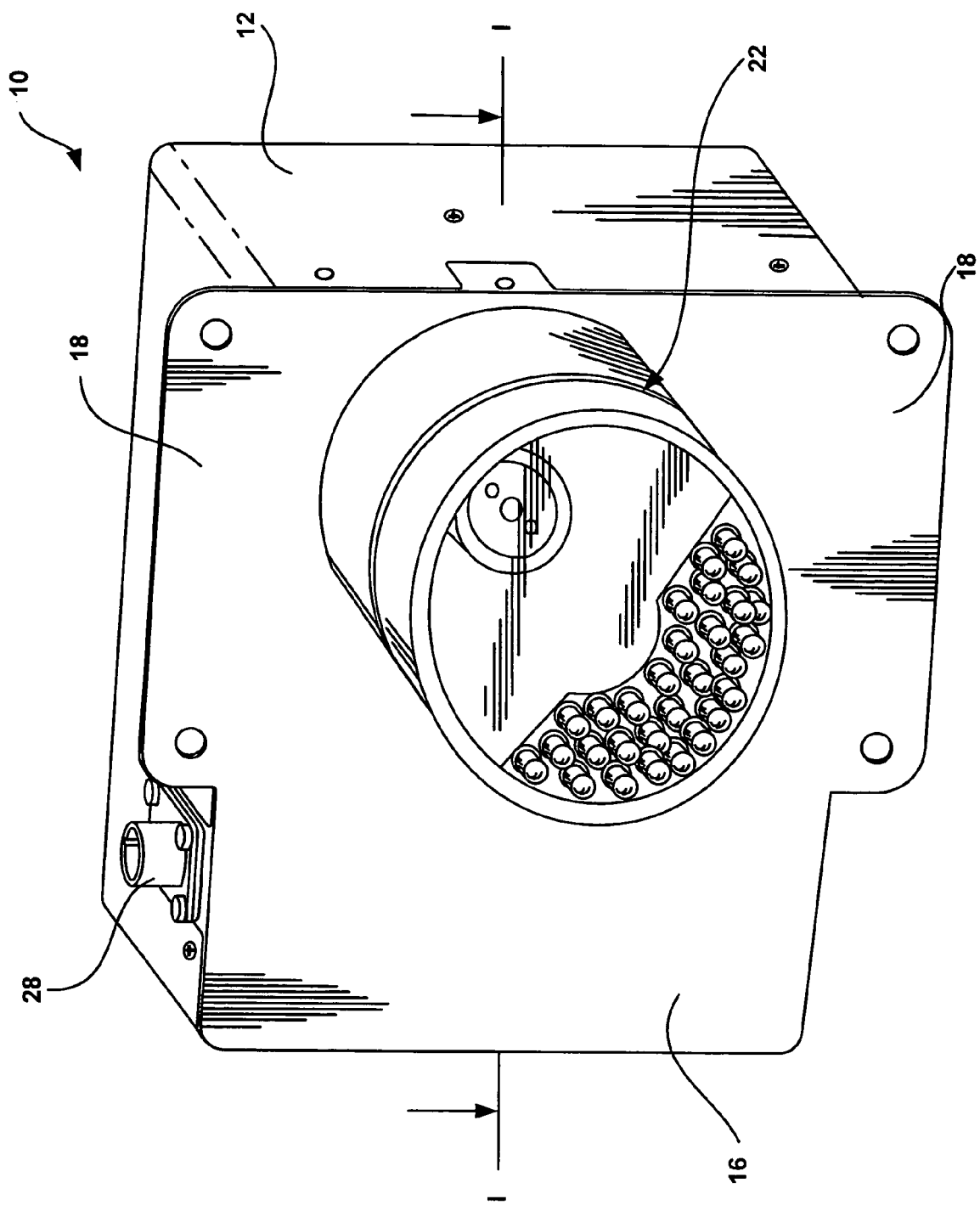
FIG. 1 is a perspective view of a universal security camera constructed in accordance with teachings of the present invention.

While the present invention is susceptible to various modifications and alternative forms, certain preferred embodiments are shown by way of example in the drawings and will be described in detail herein. It should be understood, however, that it is not intended to limit the invention to the particular forms described, but to the contrary, the invention is intended to cover all modifications, alternatives, and equivalents falling within the spirit and scope of the invention defined by the appended claims.

Figure 2:
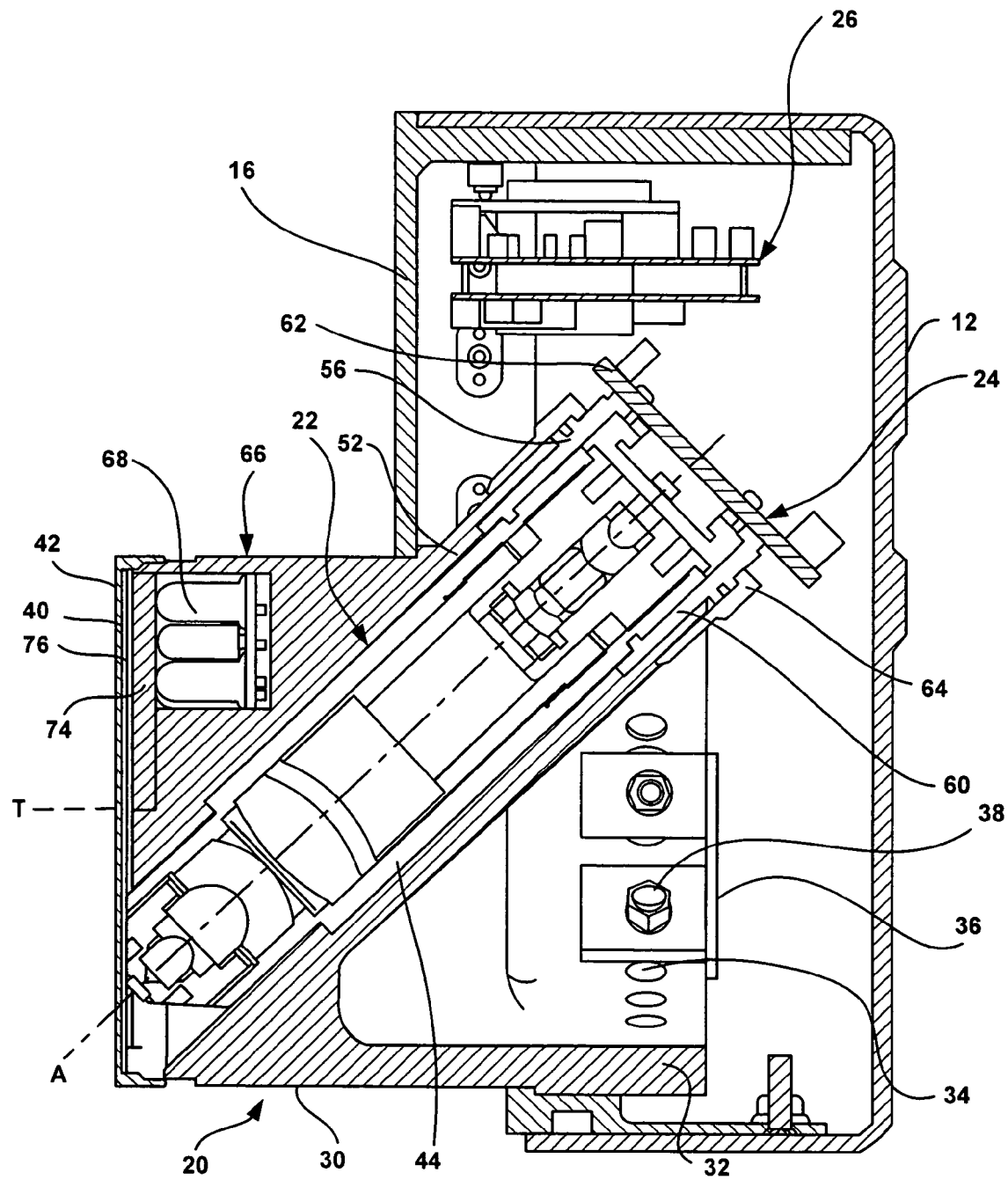
FIG. 2 is a cross-sectional side view as taken generally along line I—I in FIG. 1.

Now referring to the drawings, wherein like numerals designate like components, a security camera 10 is illustrated in FIGS. 1 and 2. Preferably, the camera 10 is externally compact and modular in design, having dimensions that permit mounting in one of many possible installation locations within an aircraft cabin structure. The camera 10 generally includes a rear housing 12 that defines an internal cavity 14 having a front opening. A front plate 16 is fastened to the rear housing 12 to extend across the front opening, thereby enclosing the interior cavity 14. The front plate 16 includes projecting side flanges 18 that may be used for mounting the camera 10 to an appropriate external structure.

In the embodiment illustrated in FIGS. 1 and 2, the camera 10 further includes a turret 20 that is mounted within a circular opening in the front plate 16. The turret 20 is rotatably adjustable relative to the front plate 16 about a turret axis T (FIG. 2). In a possible installation, camera 10 is mounted by securing the flanges 18 against a rear side of a wall panel (not shown) of the aircraft cabin, so that the turret 20 projects through a cutout in the wall panel for viewing. The housing 14, front plate 16, and turret 20 are preferably made of metal, such as stainless steel or A356 aluminum, but other suitable materials could be used instead, for example, plastic or composite material.

The camera 10 can also be mounted to or behind a cockpit door, bulkhead, galley storage structure, or any appropriate structure. The dimensions of the camera 10 are selected so that it can fit in as many contemplated installation locations as possible, thereby avoiding a need to manufacture multiple variations the camera. For example, in mass-produced aircraft, several camera installation locations may be typically offered, and the camera 10 is suitable for use at any one or all of the selected locations. Furthermore, in an embodiment (not shown), the universal security camera 10 can optionally be mounted behind a camouflaging surveillance window, such as a neutral density filter, two-way mirror, or some combination of linear polarizers and waveplates.

Generally, the camera 10 is operable to create an electronic image signal from light received from a field of view. More particularly, with reference to FIG. 2, the camera 10 includes a lens assembly 22 to receive and focus light, an optical sensor 24 to convert the focused light into an electronic signal, and a main circuit 26 to process the signal from the optical sensor 24 into a video signal. As shown in FIG. 1, the camera 10 includes at least one externally accessible connector 28 to provide a video signal output. Those skilled in the art will understand that the circuitry can be selected and configured to generate video output according to any desired standard, for example NTSC, RS-170A, PAL, SECAM, or a digital television format and the connector 28 will be compatible therewith. In the illustrated example, the connector 28 is a class E, 13 pin round NTSC connector.

The lens assembly 22 is mounted to the turret 20 in a fixed manner so that rotation of the turret 20 about the axis T is effective to selectively aim the lens assembly 22 and its corresponding field of view. The turret 20 is generally cylindrical, having a forwardly projecting portion 30 and a rear portion 32 that is disposed interiorly of the front plate 16. A plurality of incremental perforations 34 are disposed peripherally around the rear portion 32 of the turret 20. With reference to FIG. 2, to hold the turret 20 in a fixed position relative to the front plate 16, the rear turret portion 32 is secured to a bracket 36 that projects from the front plate 16. More particularly, screws 38 are secured through respective perforations 34 aligned with openings in the bracket 36 so that the turret 20 is secured in a selected orientation about the axis T. The turret 20 can be adjusted by removing the screws 38, rotating the turret 20 about the axis T to align perforations corresponding to a desired orientation, and replacing the screws 38 through the aligned perforations 34. The turret 20 also includes a protective window 40 positioned generally forwardly of the lens assembly 22 and securely fixed by a threaded retainer ring 42. The window 40 is made of a transparent material.

Still referring to FIG. 2, the lens assembly 22 generally includes a barrel 44 having a central optical axis A. The barrel 44 holds a series of optical elements along the axis A, as will be described below in connection with FIG. 6. A pinhole aperture 48 is disposed in a tip 44a of the barrel 44 at an object side of the lens elements to permit an entry of light to the series of optical elements. As illustrated in FIG. 2, the barrel 44 is mounted to the turret 20 so that the optical axis A is at an oblique angle relative to the turret axis T. The tip 44a which has a preferably beveled shape. The beveled shape advantageously enables positioning of the lens assembly 22 so that the pinhole aperture 48 is close to an interior side of the transparent window 40.

Figure 3:
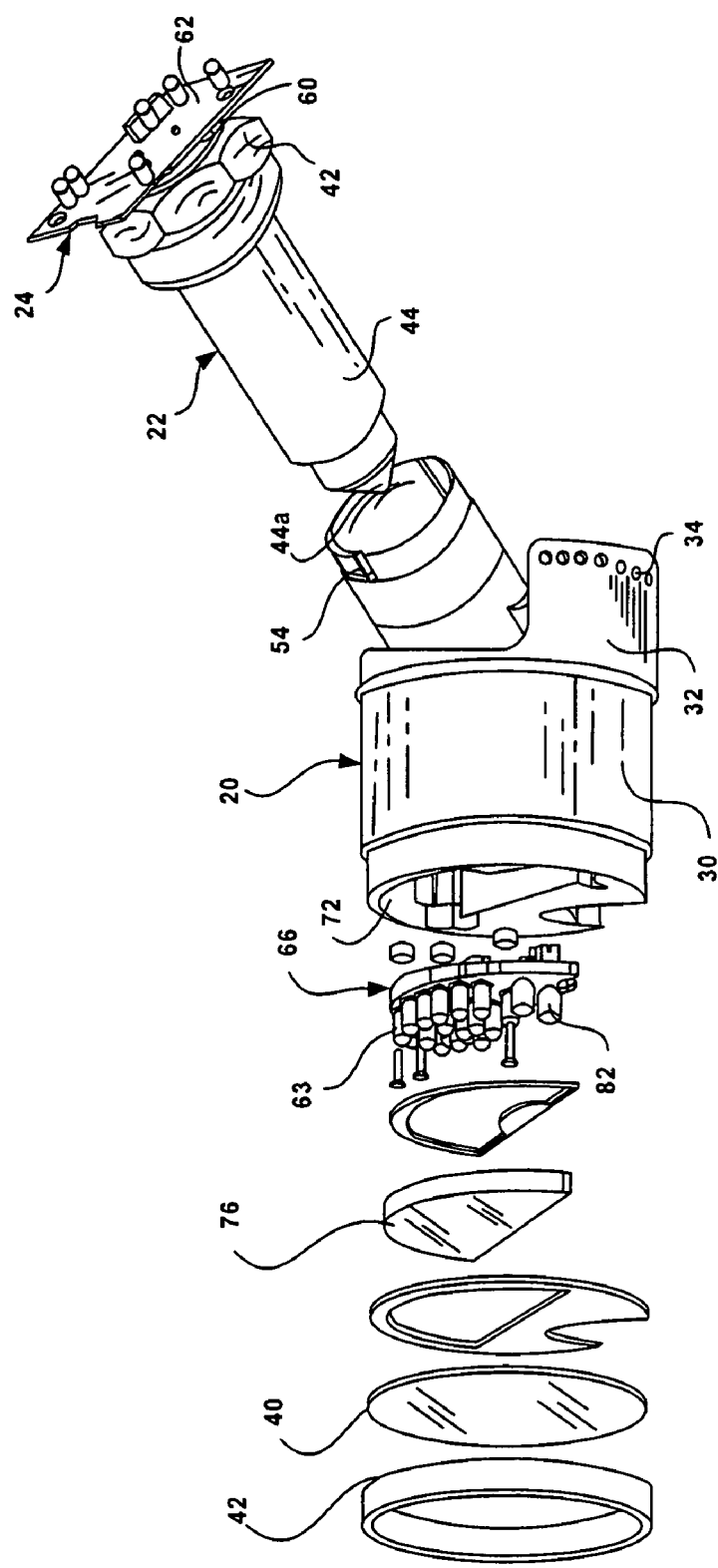
FIG. 3 is an exploded, perspective view of the turret and lens assembly of the camera of FIGS. 1 and 2.

To securely hold the lens assembly 22, the turret 20 includes a sleeve 52 shaped to complementarily receive the barrel 44, as illustrated in FIGS. 2 and 3. The sleeve 52 has one or more alignment slots 54 (FIG. 3) which receive respective locator pins 56 (FIG. 2) that project radially outwardly from the barrel 44 to prevent the lens assembly 22 from rotating within the turret sleeve 52. The sleeve 52 desirably holds the barrel 44 in a rigid manner, because deviations in the angle of the optical axis A relative to the window 45 can result in aberrations of the image projected onto the optical sensor 24.

In accordance with an aspect of the invention, the camera is effective to view visible and infrared wavelengths of light. More specifically, the lens assembly 22 is configured to focus at a fixed focal plane for a range of light wavelengths including both visible and infrared light spectra. Referring to FIG. 2, to convert light at the fixed focal plane into an electronic image, the optical sensor 24 includes a charge-coupled device (CCD) 58 positioned at the fixed focal plane as shown in FIG. 2. More particularly, the CCD 58 is surface-mounted to a sensor printed circuit board (PCB) 62 that is fixed to a central support member 60 which holds the CCD 58 at the fixed focal plane. The CCD 58 is preferably sensitive to both visible and ultraviolet light for operation in a variety of lighting conditions. The optical sensor 24 converts an image focused on the CCD 58 into an electronic signal that is sent to the main circuit 26.

The main circuit 26 is operable to process the signal from the optical sensor 24 into a video output signal that is delivered from the connector 28. (FIG. 1) Furthermore, the main circuit includes a power supply, such as a power choke coil, to operate the optical sensor 24. The main circuit 26 may be an integrated circuit comprising one or more printed circuit boards. In an embodiment, the CCD has an NTSC standard 768 (v) by 494 (h) pixel resolution and a signal to noise ratio of 46 decibels. The main circuit may include one or more digital signal processors for processing the video output. Additionally, the universal security camera 10 operates from an available power source, such as a 15 Volt DC power supply of a type typically available on a commercial aircraft.

In accordance with further aspect of the invention, the optical sensor 24 is mounted for adjustable rotational orientation relative to the optical axis A. The sensor PCB 62 is fastened to the central support member 60 with screws 63. For mounting the optical sensor 24 to the lens assembly 22 and for axially retaining the lens assembly 22 within the sleeve, a locking nut 64 is rotationally disposed exteriorly around the central support member 60. The locking nut 64 threadably mates with a rearmost portion of the sleeve 52, securing the central support member 60 axially against the lens assembly 22. Prior to tightening the locking nut 64, an installer rotates the optical sensor 24 to a desired orientation about axis A as needed to square up the resulting video image, depending on the orientation of the turret 20 about axis T. The rotational adjustability the sensor 24 about axis A combined with the rotational adjustability of the turret 20 about the axis T allows the camera 10 to capture a desired view through the lens assembly 22, thereby permitting the camera to be used in a variety of mounting positions yet still capture a desired view.

In order to provide invisible illumination in dark conditions, the camera 10 additionally includes an infrared illumination source 66. The infrared illumination source 66 provides infrared illumination in a direction of the viewed objects when visible light is below a certain level. As a result, the source 66 enables the camera 10 to operate in dark conditions if adequate illumination of the view area is not available from an external light source. In the illustrated example, the infrared illumination source 66 includes an array of infrared light emitting diodes (LEDs) 68 mounted to an infrared PCB 70. The source 66 is mounted interiorly of the protective window 40 within a semicircular recess 72 (FIGS. 2 and 3) at a front side of the turret 20.

In order to avoid drawing attention to the camera during use, the camera 10 additionally includes an infrared passband filter 74 to block visible wavelengths of light (typically red) which may be generated by the infrared illumination source 66. As a result, the visible light does not pass to an exterior of the camera 10 where it could be seen. The infrared passband filter 74 resides within a portion of the recess 72 between the source 66 and the protective window 40 as shown in FIGS. 2 and 3. In the illustrated embodiment, the filter 74 is semicircular in shape to cover the infrared source 66 but to not cover the aperture 48 of the lens assembly 22.

In an embodiment, the camera may optionally include a supplemental filter 76 to adapt the camera for optimal effectiveness as needed in specific applications. For example, the supplemental filter 76 can be selected to optimize image capturing effectiveness in certain lighting environments or alternatively to provide camouflage. As illustrated in FIG. 3, the supplemental filter 76 is the same shape as the protective window 40 in order to cover the aperture 22 of the lens assembly 22. In an embodiment, the supplemental filter 76 can be a neutral density filter or two-way mirror made from a material such as polycarbonate or a metal substrate coated glass. Alternatively, the supplemental filter 76 could comprise polarizers and/or waveplates, for example a combined linear polarizer and quarter-waveplate. Preferably, a first spacer gasket 78 is positioned between the supplemental filter 76 and the infrared passband filter 74. A second spacer gasket 80 is positioned a spacer between the infrared passband filter 74 and the infrared illumination source 66.

So that the infrared illumination source 66 is actuated only when needed, the camera 10 preferably includes a light detector 82 (FIG. 3) operable to actuate the infrared LEDs during certain external light conditions. For example, in an embodiment, the light detector 82 is mounted to the infrared PCB 70 and is operable to actuate the infrared LEDs when visible light is below a suitable level. The light detector 82 sends a signal to an internal logic of the camera 10 at the main circuit 26 (FIG. 2) that controls the power supplied to the infrared LEDs, turning the LEDs on or off as light conditions change.

Figure 6:
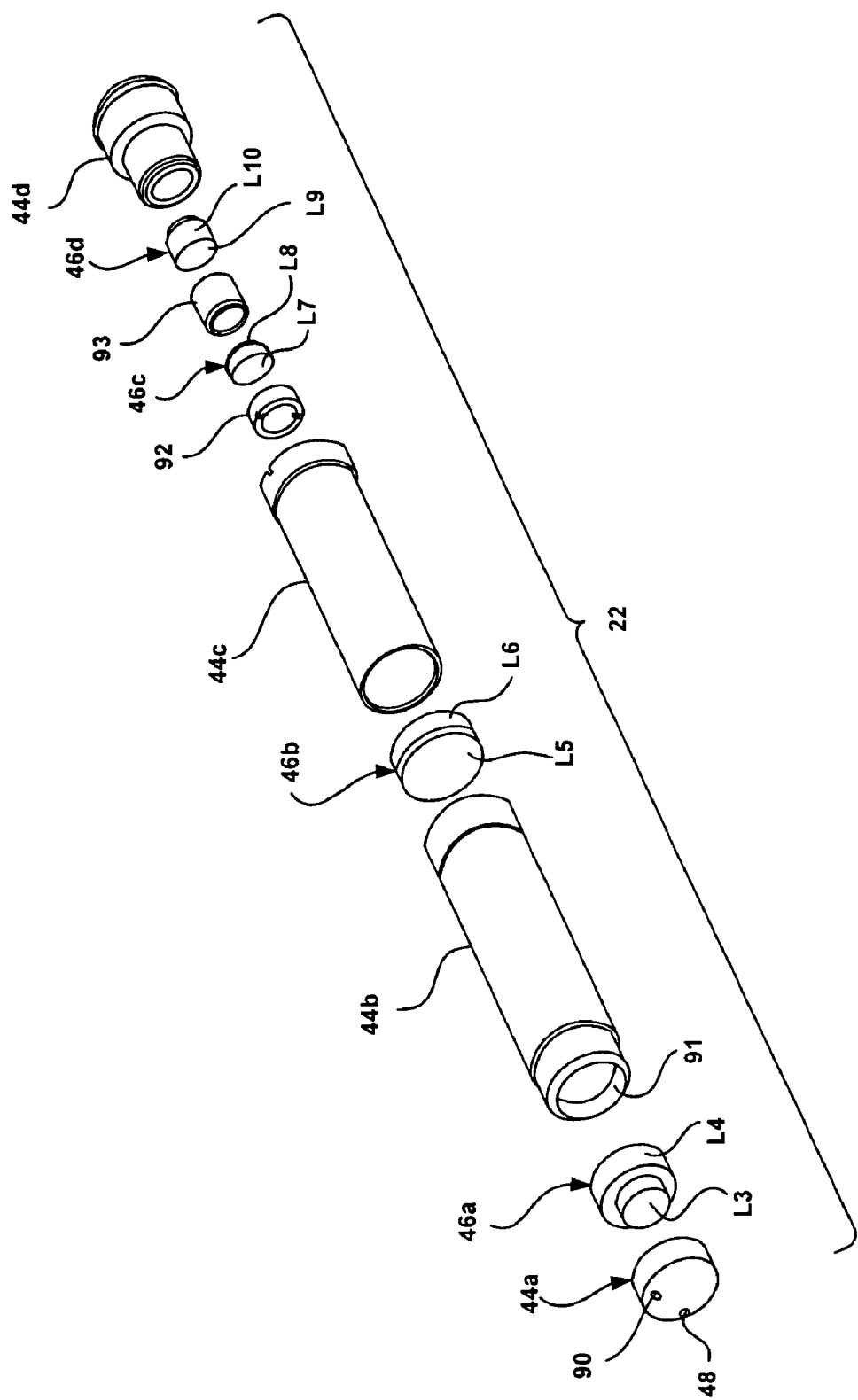
FIG. 6 is an exploded perspective view of a lens assembly as used in the cameras of FIGS. 1–5.

The lens assembly 22 will now be described in greater detail with respect to FIG. 6. The lens assembly 22 has an aperture 48 of a type generally referred to as a pinhole aperture due to its relatively small size. In an embodiment, the pinhole aperture 48 has a diameter of no more than a few millimeters, preferably less than about one millimeter in diameter, and most preferably about 0.802 mm. The pinhole aperture 48 results in a wide field of view due to its small size and its position at the object side of lens elements, characteristics well-suited for covert security surveillance.

In accordance with an embodiment of the invention, the lens assembly 22 is configured to focus both visible and infrared light in a range of wavelengths between about 400–1000 nm. This relatively wide range of wavelengths is achieved by a special combination of achromatic doublets (or "achromats") 46a, 46b, 46c, 46d with anti-reflective (e.g., $MgF_2$) coatings. Preferably, the pinhole aperture is fixed at F/5 and provides a cone-shaped field of view defined by boundaries at about 45 degrees relative to the optical axis A. The lens assembly 22 is preferably optimized for working distances between about 400 mm and infinity, focusing to an image of about 6 mm on the diagonal with a back focal length of 7.0 mm from the rear end of the sleeve 52 to the CCD 52. In the presently preferred embodiment, the length of the lens assembly is about 101 mm from the first lens surface on the object side to the image plane. Herein, the general construction of the lens assembly 22 will be described, followed by a detailed description of the optical elements.

The lens assembly 22 generally includes a series of first, second, third and fourth achromats, respectively indicated as 46a, 46b, 46c, 46d from object side to image side, which are mounted in an appropriately spaced relation along the optical axis A in the barrel 44, which includes multiple sections: the beveled tip 44a, a main barrel portion 44b, a retainer portion 44c and a rear portion, 44d, as assembled from object side to image side.

More specifically, beginning from the object side, the first achromat 46a fits into an object end of the main barrel portion 44b against an annular step 91. The beveled tip 44 is mounted to the main barrel portion 44b, retaining the first achromat 46a in a fixed position against the step 91. The tip 44a is provided with male threads that engage female threads on the interior of the main barrel portion 44b. The tip 44a includes at least one recess 90 which is appropriately shaped to receive a tool for applying torque for screwing or unscrewing the tip 44a. For example, the recess 90 can be hex-shaped to receive a hex-shaped tool such as an allen wrench. A second achromat 46b fits into the opposite end of main barrel portion 44b from an object side, where the second achromat resides in a desired position spaced from the first achromat 46a. The barrel 44 further includes a retainer portion 44c that slips into the main barrel portion 44b and fits behind the second achromat 46b. From a rear end of the retainer portion 44c, described from the object side to the image side, a spacer 92, the third achromat 46c, another spacer 93 and the fourth achromat 44d fit together in a stacked relation, held fixed by the rear barrel portion 44d which is mounted to the retainer portion 44c.

In an embodiment, each of the achromats 46a–d is an achromatic doublet that respectively includes two lens elements cemented together with an optical quality adhesive, such as NORLAND optical adhesive NOA61. Table 1 identifies the first, second, third and fourth achromats 46a–d in terms of lens elements L4–L10 and provides an estimated focal length for each.

TABLE 1

| Achromat | Element # | Lens Elements | Estimated Focal Length (mm) |
|---|---|---|---|
| First | 46a | L3 and L4 | 55.9 |
| Second | 46b | L5 and L6 | 21.5 |
| Third | 46c | L7 and L8 | 24.5 |
| Fourth | 46d | L9 and L10 | 21.0 |

Figure 7:
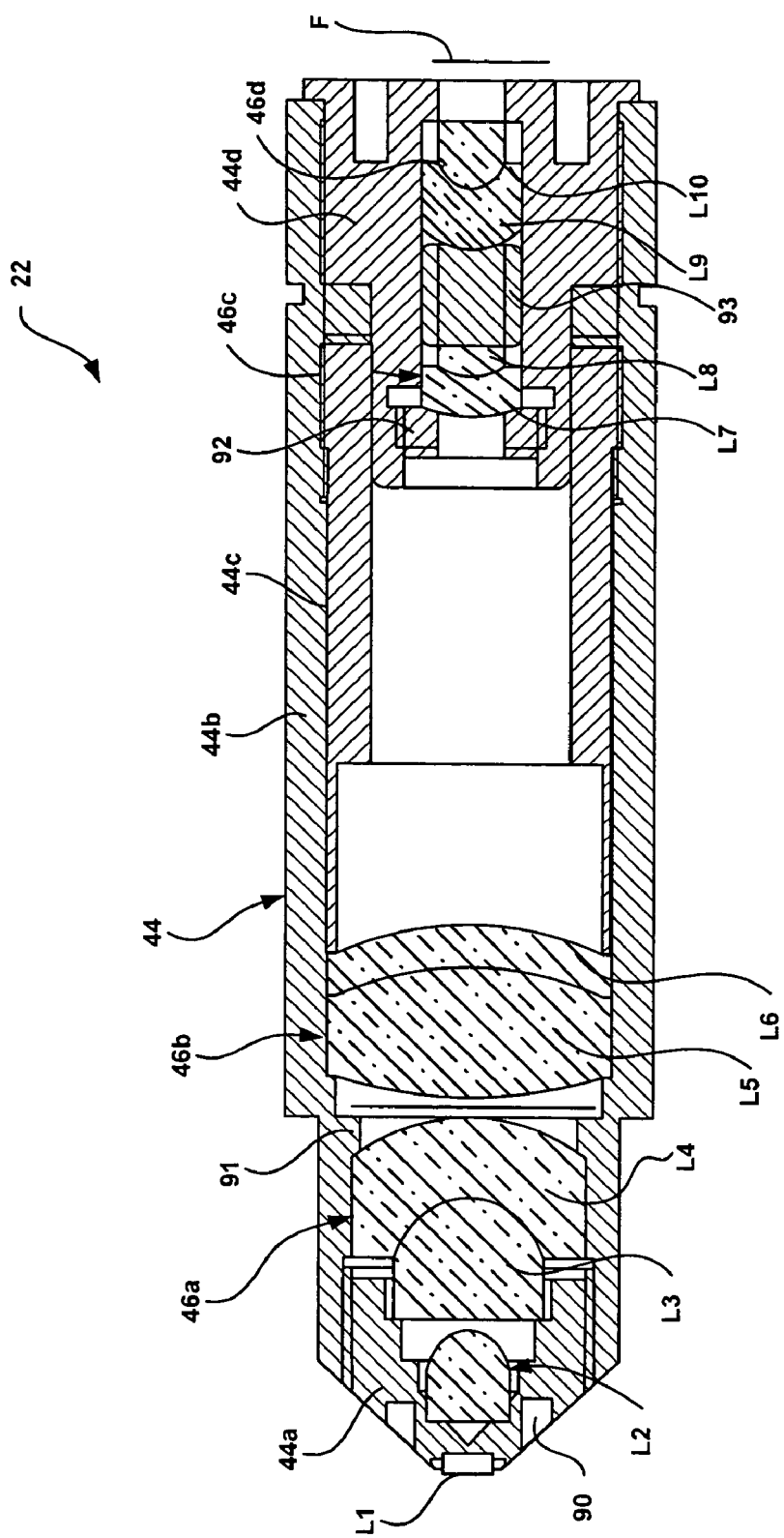
FIG. 7 is a side, sectional view of the lens assembly.

Parameters for suitable lens elements L1–10 of an embodiment of the lens assembly are identified below in Table 2, wherein L1 and L2 are lens elements contained within the pinhole aperture 48, as illustrated in FIG. 7. Table 2 describes L1–L10 and their respective surface radii R in order from optical side to image side with respect to the assembled lens assembly 22.

TABLE 2

| Lens Element | Radius Of Curvature (mm) | Focal Length (mm) | Glass Type (Schott) | Coating |
|---|---|---|---|---|
| L1 | R1 = PLANO (∞)<br>R2 = 4.966 | −9.6 | BK7 | 1/4 λ MgF2 @ 550 nm |
| L2 | R1 = 5.160<br>R2 = 4.966 | 18.1 | LAK9 | 1/4 λ MgF2 @ 550 nm |
| L3 | R1 = 100.035<br>R2 = 6.442 | 10.0 | SK16 | 1/4 λ MgF2 @ 550 nm |
| L4 | R1 = 6.442<br>R2 = 23.503 | −12.6 | SF4 | 1/4 λ MgF2 @ 550 nm |
| L5 | R1 = 26.923<br>R2 = 15.560 | 15.560 | LAFN21 | 1/4 λ MgF2 @ 550 nm |
| L6 | R1 = 15.560<br>R2 = 40.009 | −35.6 | SF4 | 1/4 λ MgF2 @ 550 nm |
| L7 | R1 = 26.431<br>R2 = 8.926 | −18.6 | SF4 | 1/4 λ MgF2 @ 550 nm |
| L8 | R1 = 8.926<br>R2 = 84.31 | 10.3 | LAFN21 | 1/4 λ MgF2 @ 550 nm |
| L9 | R1 = 9.259<br>R2 = 3.320 | −10.1 | SF4 | 1/4 λ MgF2 @ 550 nm |
| L10 | R1 = 3.320<br>R2 = 11.616 | 4.95 | LAFN21 | 1/4 λ MgF2 @ 550 nm |

The lens elements L1–L10 and the achromats 46a–d have respective Abbe numbers and indices of refraction selected to minimize chromatic aberration across the visible spectrum and into the near infrared—the focal length for visible and infrared light is nearly equal. As a result, the lens assembly 22 is focuses images of visible and infrared light on the same focal plane F (FIG. 7). The pinhole aperture 48 collects light through the lens elements L1–L10 and focuses an image onto the CCD (FIG. 2) mounted at the focal plane F.

Figure 4:
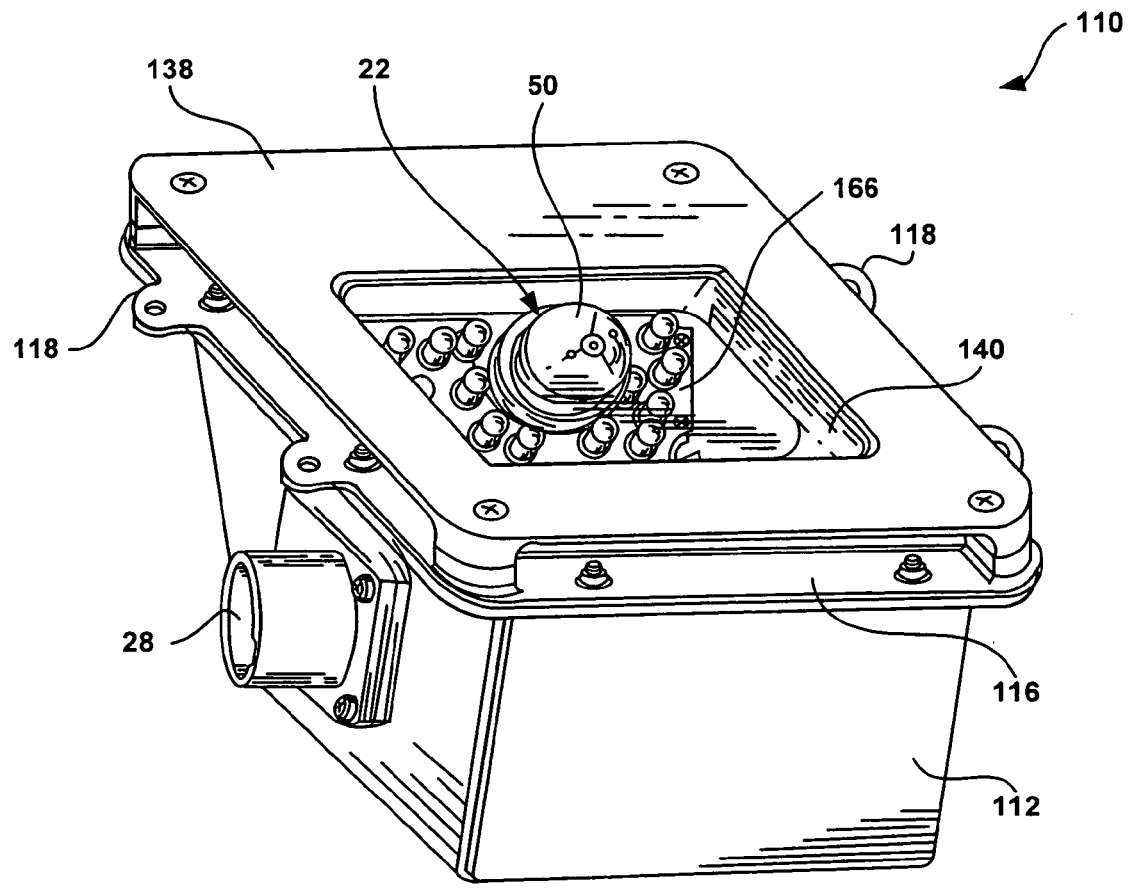
FIG. 4 is a perspective view of a security camera according to an another embodiment.
Figure 5:
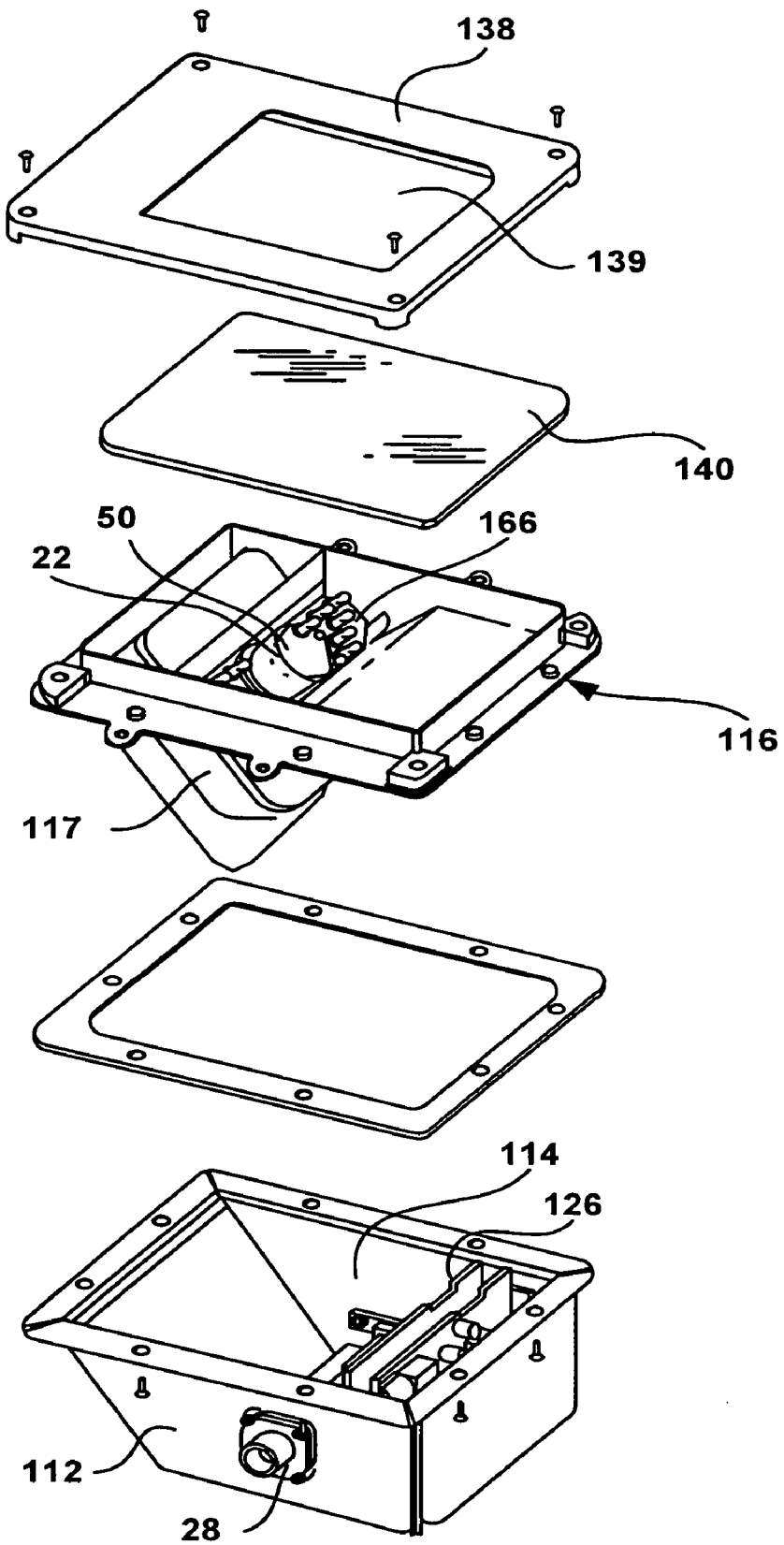
FIG. 5 is an exploded, perspective view of the security camera of FIG. 4.

Turning to FIGS. 4 and 5, a camera 110 is illustrated according to an alternative embodiment that includes the lens assembly 22 described above, but which does not include a turret. The camera 110 has few components and is economical for use in applications where adjustability of the lens orientation is not required. The camera 110 is also externally compact and modular in design, allowing for mounting in many possible installation locations within an aircraft cabin structure.

The camera 110 generally includes a rear housing 112 that defines an internal cavity 114 having a front opening, as shown in FIG. 5. The lens assembly 22 is mounted to a platform 116 which is fastened to the rear housing 112 at the front opening. The platform 116 includes projecting side flanges 118 that may be used for mounting the camera 110 to an appropriate external structure.

The camera 110 generally operates in a manner similar to the camera 10 described in connection with FIGS. 1–3 to convert light received by the lens assembly 22 into a video signal. For example, the camera 110 includes an optical sensor (not shown) mounted to a rear of the lens assembly and a main circuit 126 for processing the video signal, delivered as an output from connector 28. Referring to FIG. 5, the main circuit 126 is mounted to the housing 112 within the internal cavity.

The platform 116 includes a recessed portion 117 (FIG. 5) which may be at an oblique angle, as illustrated. The lens assembly 22 and an infrared illumination source 166 are mounted to the platform 116 so that the recessed portion 117 (FIG. 5), lens assembly 22 and optical sensor are contained within the interior cavity of the housing 112. The camera 110 further includes a front cover 138 that is fixed to the platform 116. A window opening 139 is defined in the front cover 138, and a protective window element 140 is mounted between the front cover and the platform 116 to cover the opening 139. The beveled tip 50 of the lens assembly 22 is positioned closely to the window 140 for compactness. The window element 140 can provide camouflage and/or provide desired light filtration.

Figure 8:
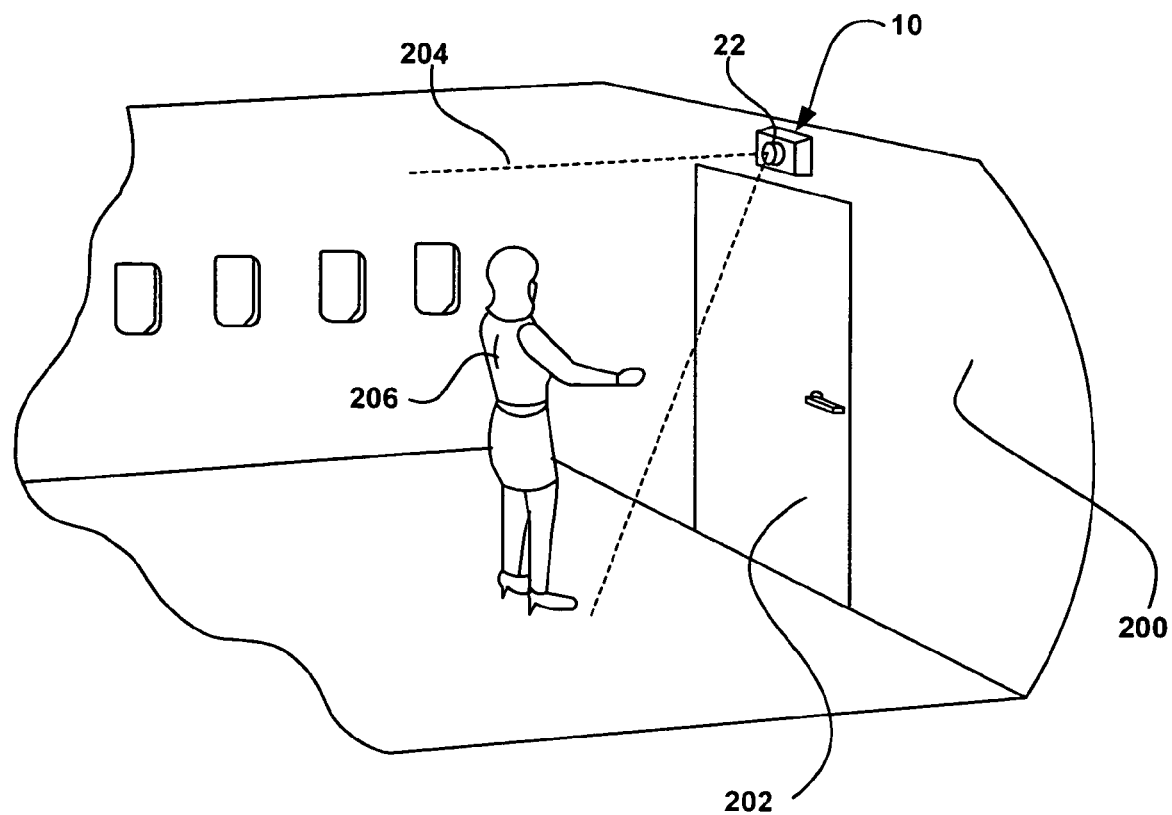
FIG. 8 is a schematic, fragmentary perspective view of a camera mounted in a possible installation location within a cabin.

FIG. 8 illustrates the camera 10 mounted in an exemplary installation location. In particular, the camera 10 is mounted to behind a panel 200 above a cockpit door 202. The turret 22 extends through a cutout in the panel so that the lens assembly is unobstructed. Preferably, the lens assembly is aimed by the turret 22 to provide a field of view 204 sufficient for viewing a person 206 standing in the vicinity of the door 202, the field of view encompassing the person's face downward.

It should be understood that various changes and modifications to the presently preferred embodiments described herein would be apparent to those skilled in the art. Such changes and modifications may be made without departing from the spirit and scope of the present invention and without diminishing its attendant advantages.

What is claimed is:

1. A lens assembly adapted for use with a camera that comprises a housing and a turret, the lens assembly comprising:
   a barrel including a generally bevel shaped tip,
   at least one lens element mounted within the barrel for focusing light on a single fixed focal plane disposed opposite the generally bevel shaped tip, and
   a pinhole aperture defined within the generally bevel shaped tip of the barrel at an object end of the at least one lens element.

2. The lens assembly of claim 1, wherein the aperture has a diameter of less than one mm.

3. The lens assembly of claim 2, wherein the aperture has a diameter of about 0.802 mm.

4. The lens assembly of claim 1, wherein the at least one lens element includes at least one achromatic doublet.

5. The lens assembly of claim 4, wherein the at least one achromatic doublet includes a pair of optical elements having a complimentary shape and bonded together.

6. The lens assembly of claim 4 wherein the at least one achromatic doublet comprises first, second, third and fourth achromatic doublets mounted in spaced relation along a length of the barrel.

7. The lens assembly of claim 6 wherein the length of the barrel is about 101 mm.

8. The lens assembly of claim 6 wherein each of the first, second, third and fourth achromatic doublets further comprise an anti-reflective coating.

9. The lens assembly of claim 8 wherein the anti-reflective coating comprises $MgF_2$.

10. The lens assembly of claim 1, further comprising a sensor device located at the single fixed focal plane for converting light at the single fixed focal plane to an electronic image signal.

11. The lens assembly of claim 10 wherein the sensor device is mounted to the barrel and rotatable in the single fixed focal plane about an optical axis of the at least one lens element.

12. The lens assembly of claim 10 wherein the sensor device comprises a CCD.

13. The lens assembly of claim 12 wherein the CCD has a resolution of about 768 horizontal pixels by about 494 vertical pixels and a signal to noise ratio of about 46 dB.

14. A lens assembly comprising:
   a generally cylindrical barrel including a bevel shaped tip having a pinhole aperture;
   a plurality of lens elements aligned along a central axis of the generally cylindrical barrel for focusing visible and infrared light wavelengths on a single, fixed focal plane distal from the pinhole aperture; and
   a sensor device located in the single, fixed focal plane for converting visible and infrared light to an electronic image signal.

15. The lens assembly of claim 14 wherein the plurality of lens elements comprises:
   a first achromatic doublet having a focal length of about 55.9 mm;
   a second achromatic doublet having a focal length of about 21.5 mm;
   a third achromatic doublet having a focal length of about 24.5 mm; and
   a fourth achromatic doublet having a focal length of about 21.0 mm,
   wherein the first, second, third and fourth achromatic doublets are spaced apart in a fixed relation to each other along the central axis.

16. The lens assembly of claim 15 wherein the first and second achromatic doublets are configured substantially proximate to each other and proximate the pinhole aperture, and wherein the third and fourth achromatic doublets are configured substantially proximate to each other and distal the pinhole aperture.

17. The lens assembly of claim 15 wherein the generally cylindrical barrel comprises:
   a main barrel portion including a first end and a second end, the bevel shaped tip, the first achromatic doublet and the second achromatic doublet being disposed in the first end;
   a retainer portion that is received in the second end of the main barrel portion for separating the second achromatic doublet from the third achromatic doublet; and
   a rear barrel portion receiving the third achromatic doublet and the fourth achromatic doublet, the rear barrel portion holding the retainer portion inside the main barrel portion.

18. The lens assembly of claim 14 wherein the pinhole aperture has a diameter in the range of about one mm to about 0.802 mm.

19. The lens assembly of claim 14 wherein the sensor device is mounted to the barrel and rotatable in the single fixed focal plane about the central axis.

20. The lens assembly of claim 14 wherein the sensor device comprises a CCD.

21. The lens assembly of claim 20 wherein the CCD has a resolution of about 768 horizontal pixels by about 494 vertical pixels and a signal to noise ratio of about 46 dB.

* * * * *